(12) United States Patent
Carrie

(10) Patent No.: US 10,208,792 B2
(45) Date of Patent: Feb. 19, 2019

(54) SELF-TRIGGERING, ANTI-SEIZING GUIDE BEARING, SHOCK ABSORBER AND CYLINDER COMPRISING AT LEAST ONE SUCH BEARING

(71) Applicant: RATIER FIGEAC, Figeac (FR)

(72) Inventor: Jean-Paul Carrie, Figeac (FR)

(73) Assignee: RATIER FIGEAC, Figeac (FR)

( * ) Notice: Subject to any disclaimer, the term of this patent is extended or adjusted under 35 U.S.C. 154(b) by 8 days.

(21) Appl. No.: 15/212,501

(22) Filed: Jul. 18, 2016

(65) Prior Publication Data

US 2017/0016476 A1 Jan. 19, 2017

(30) Foreign Application Priority Data

Jul. 17, 2015 (FR) ...................................... 15 56811

(51) Int. Cl.
| | |
|---|---|
| F16C 29/00 | (2006.01) |
| F16F 9/20 | (2006.01) |
| F16C 29/02 | (2006.01) |
| F16F 9/36 | (2006.01) |
| F16D 25/08 | (2006.01) |
| F16D 25/12 | (2006.01) |

(52) U.S. Cl.
CPC ............ F16C 29/002 (2013.01); F16C 29/02 (2013.01); F16D 25/08 (2013.01); F16D 25/12 (2013.01); F16F 9/20 (2013.01); F16F 9/366 (2013.01); *F16C 2326/43* (2013.01); *F16F 2230/24* (2013.01)

(58) Field of Classification Search
CPC .......... F16C 3/03; F16C 19/52; F16C 29/002; F16C 29/02; F16C 33/08; F16C 2326/43; F16F 15/1209; F16F 15/13178

USPC ....................... 384/7, 8, 29, 32, 42, 102, 624
See application file for complete search history.

(56) References Cited

U.S. PATENT DOCUMENTS

| | | | | |
|---|---|---|---|---|
| 3,452,349 A | * | 6/1969 | Wood ...................... | F16C 19/52 200/61.08 |
| 4,664,539 A | * | 5/1987 | Li .......................... | F16C 19/52 384/102 |
| 6,712,515 B2 | * | 3/2004 | Fite ........................ | F16C 19/52 384/126 |

FOREIGN PATENT DOCUMENTS

| | | |
|---|---|---|
| EP | 2 530 343 A1 | 12/2012 |
| EP | 2 693 074 A2 | 2/2014 |
| EP | 2 857 711 A1 | 4/2015 |
| WO | 2007/055685 A1 | 5/2007 |

OTHER PUBLICATIONS

French Preliminary Search Report, dated May 3, 2016, from corresponding French Application.

* cited by examiner

*Primary Examiner* — James Pilkington

(74) *Attorney, Agent, or Firm* — Young & Thompson

(57) ABSTRACT

A bearing for guiding a first guided piece includes a first bearing surface with respect to a second bearing surface fixedly attached to a second guided piece. At least one first intermediate piece is interposed between the first bearing surface and the first guided piece and at least one first automatic release assembly for i) in a first assembly state, fixedly attaching the at least one first intermediate piece and the first guided piece for guidance forces which are lower than a triggering value, and ii) in a release state, permitting a relative displacement of the first guided piece with respect to the at least one first intermediate piece, at least in one displacement orientation, for guidance forces which are greater than the triggering value of the first assembly.

18 Claims, 7 Drawing Sheets

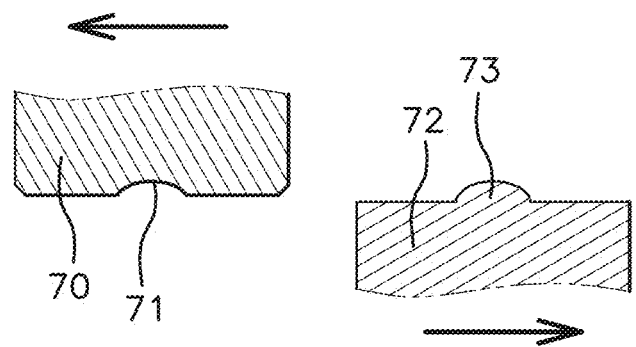
Fig 9
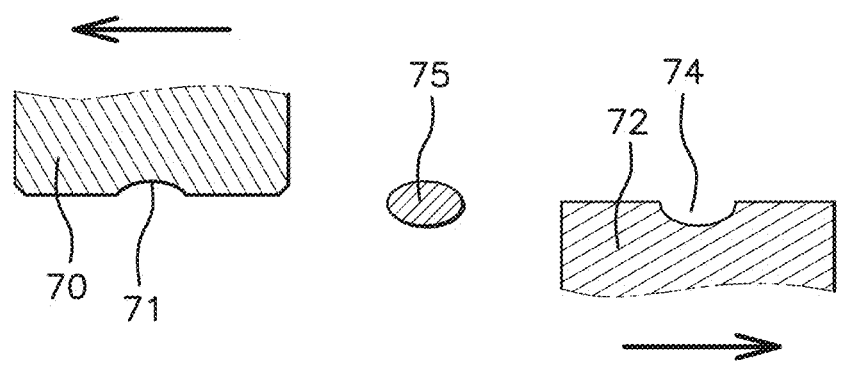

SELF-TRIGGERING, ANTI-SEIZING GUIDE BEARING, SHOCK ABSORBER AND CYLINDER COMPRISING AT LEAST ONE SUCH BEARING

BACKGROUND OF THE INVENTION

Field of the Invention

The invention relates to a bearing for guiding—in particular but not exclusively by relative sliding, preferably without rolling—a first guided piece with respect to a second guided piece, comprising a first bearing surface:
fixedly attached to the first guided piece,
arranged to co-operate in guiding contact with a second bearing surface fixedly attached to the second guided piece.

Throughout the text, the expression "guiding contact" means that the bearing surfaces are at least partially in contact with each other and that this contact is arranged so as to act in a guiding manner for the first guided piece and the second guided piece with respect to each other with at least one degree of freedom, i.e. with at least one translation and/or with at least one rotation. The terms "fixedly attached", "to fixedly attach" and derivatives thereof mean that two elements are arranged with respect to each other to normally have the same kinematics and the same movement with respect to each degree of freedom of said guiding contact, in the absence of undesirable seizing.

Description of the Related Art

Numerous known mechanisms (hydraulic and/or pneumatic and/or electric and/or electromagnetic shock absorbers or cylinders . . . ) incorporate various guide bearings. In some applications, such as in aeronautics, seizing of such a bearing likely to cause an at least partial locking of the two guided pieces with respect to each other can have serious consequences. It is thus necessary to ensure that such locking cannot occur. The currently envisaged solutions for providing this guarantee substantially consist of ensuring a high level of manufacturing quality for these mechanisms and of regularly checking the correct operation, absence of wear and presence of sufficient lubrication. When allowed by the kinematics of the mechanical device as a whole, a plurality of similar elements are placed in series such that seizing of one of the elements does not prevent operation of the others, which may possibly partly compensate for this seizing. However, this solution is costly in terms of installation and maintenance, is troublesome and not completely adequate.

BRIEF SUMMARY OF THE INVENTION

The invention aims to propose an alternative solution to this problem in the form of an anti-seizing guide bearing, i.e. one which is not liable to lock the two guided pieces with respect to each other if a guiding contact seizes.

The invention also aims to propose such a guide bearing without imposing particular constraints with respect to the characteristics or quality of the guiding action which can be achieved, the guide bearing being able to have any desired characteristics and guiding quality in the absence of seizing.

The invention also aims to achieve these objects in a simple, economical manner without imposing a significant change to the dimensions or weight of the guide bearing or the mechanism incorporating same.

The invention aims more particularly to propose such a guide bearing also allowing the occurrence of a seizing incident to be detected.

To this end, the invention thus relates to a bearing for guiding a first guided piece with respect to a second guided piece comprising a first bearing surface:
fixedly attached to the first guided piece,
arranged to co-operate in guiding contact with a second bearing surface fixedly attached to the second guided piece,
characterised in that it comprises at least one first intermediate piece interposed between the first bearing surface and the first guided piece and at least one first automatic release assembly adapted for:
in one state, named assembly state, fixedly attaching the first intermediate piece and the first guided piece for guidance forces between the first guided piece and the second guided piece which are lower than a value, named triggering value of the first assembly,
in one state, named release state, allowing a relative displacement of the first guided piece with respect to the first intermediate piece, at least in one displacement orientation, for guidance forces between the first guided piece and the second guided piece which are greater than said triggering value of the first assembly.

A guide bearing in accordance with the invention thus comprises at least one automatic release assembly, i.e. a self-triggering assembly, allowing the first guided piece to be released with respect to the first intermediate piece, and thus with respect to the second guided piece, when the guidance forces, at least in one displacement orientation (in the movement of the guiding contact) between the first guided piece and the second guided piece, exceed a triggering value, i.e. in particular when at least partial seizing occurs.

In some embodiments, the guidance forces between the two guided pieces are substantially, in particular exclusively, frictional forces between the first bearing surface and the second bearing surface. Therefore, a guide bearing in accordance with the invention comprises at least one automatic release assembly, i.e. at least said first automatic release assembly, such an automatic release assembly being adapted for:
fixedly attaching (within the guiding movements) the first intermediate piece and the first guided piece for the frictional forces (static and/or dynamic) between the first bearing surface and the second bearing surface which are lower than a triggering value of this assembly,
allowing a relative displacement of the first guided piece with respect to the first intermediate piece, at least in one displacement orientation, for frictional forces, in this displacement orientation, between the first bearing surface and the second bearing surface which are greater than said triggering value of this assembly.

In some embodiments, a guide bearing in accordance with the invention comprises one and only one automatic release assembly, i.e. said first automatic release assembly. In fact, a single automatic release assembly is sufficient to avoid any locking between the two guided pieces in the case of seizing of the guiding contact between the first bearing surface and the second bearing surface.

Nevertheless, in an advantageous manner, in other embodiments a guide bearing in accordance with the invention also comprises at least one second intermediate piece interposed between the second bearing surface and the second guided piece and at least one second automatic release assembly adapted for:
in one state, named assembly state, fixedly attaching the second intermediate piece and the second guided piece for guidance forces between the first guided piece and the second guided piece which are lower than a value, named triggering value of the second assembly, in one state, named release state, allowing a relative displacement of the second guided piece with respect to the second intermediate piece, at least in one displacement orientation, for guidance forces between the first guided piece and the second guided piece which are greater than said triggering value of the second assembly. Thus, in these embodiments, a guide bearing in accordance with the invention comprises two intermediate pieces, one intermediate piece for each of the guided pieces, and two automatic release assemblies, i.e. one automatic release assembly for each of the intermediate pieces.

The triggering values of the first automatic release assembly and of the second automatic release assembly, for a same orientation of the guidance forces between the first guided piece and the second guided piece, may be different. Nevertheless, in some preferential embodiments, in an advantageous manner and in accordance with the invention, the triggering values of the first automatic release assembly and of the second automatic release assembly for a same orientation of the guidance forces between the first guided piece and the second guided piece, are similar—in particular equal.

The relative displacement of a guided piece with respect to an intermediate piece can be allowed in one displacement orientation or in both displacement orientations of each degree of freedom of the guiding contact. Depending on the applications, in some embodiments, an automatic release assembly of a guide bearing in accordance with the invention can be a unidirectional automatic release assembly or a bidirectional automatic release assembly.

A unidirectional automatic release assembly allows a relative displacement of the guided piece with respect to the corresponding intermediate piece (i.e. of the first guided piece with respect to the first intermediate piece, or of the second guided piece with respect to the second intermediate piece, as the case may be) only in one displacement orientation, for guidance forces, in this displacement orientation, between the first guided piece and the second guided piece which are greater than the corresponding triggering value (i.e. the first triggering value or the second triggering value, as the case may be).

In an advantageous manner and in accordance with the invention, at least one automatic release assembly (i.e. the first automatic release assembly and/or the second automatic release assembly, as the case may be) is a bidirectional automatic release assembly adapted for:

in a first release state, allowing a relative displacement of the guided piece with respect to the corresponding intermediate piece in a first displacement orientation for guidance forces between the first guided piece and the second guided piece which are greater than a first corresponding triggering value, in a second release state, allowing a relative displacement of the guided piece with respect to the corresponding intermediate piece in a second displacement orientation, opposite to the first displacement orientation, for guidance forces between the first guided piece and the second guided piece which are greater than a second corresponding triggering value.

Thus, in accordance with the embodiments, a guide bearing in accordance with the invention can comprise:

one and only one unidirectional automatic release assembly, one and only one bidirectional automatic release assembly, a first unidirectional automatic release assembly and a second unidirectional automatic release assembly, these two assemblies allowing displacements of the guided pieces with respect to the corresponding intermediate pieces in displacement orientations corresponding to the same and unique relative displacement orientation of the first guided piece with respect to the second guided piece, the guide bearing being self-triggering in a single displacement orientation of the guided pieces, a first unidirectional automatic release assembly and a second unidirectional automatic release assembly, these two assemblies allowing displacements of the guided pieces with respect to the corresponding intermediate pieces in displacement orientations corresponding to different relative displacement orientations of the first guided piece with respect to the second guided piece, the guide bearing being self-triggering in both displacement orientations of the guided pieces, a first bidirectional automatic release assembly and a second bidirectional automatic release assembly.

Each triggering value is selected based on the constraints peculiar to each application, and on the upper limit value which it is desirable to impose on the guidance forces, which may correspond to abnormal operation of the guide bearing, e.g. to a seizing incident.

The invention applies to any type of guiding contact between the first bearing surface and the second bearing surface. Such a guiding contact can be, in particular, complex both in terms of the different degrees of freedom in translation and/or rotation which it allows and also in terms of the type of contact between the bearing surfaces which can be purely sliding, purely rolling or a combination of sliding and rolling.

That being said, in some embodiments, in an advantageous manner, a guide bearing in accordance with the invention is also characterised in that said guiding contact provides for a relative sliding with one degree of freedom, and in that said relative displacement of a guided piece with respect to the corresponding intermediate piece is a relative sliding displacement with the same degree of freedom. In particular, in an advantageous manner and in accordance with the invention, said guiding contact provides for a relative sliding without rolling.

Thus, in particular, in an advantageous manner and in accordance with the invention, said relative displacement of the first guided piece with respect to the first intermediate piece allowed by the first automatic release assembly is a relative sliding displacement with the same degree of freedom as the degree of freedom of said guiding contact. Similarly, as a variation or in combination, as the case may be, said relative displacement of the second guided piece with respect to the second intermediate piece allowed by the second automatic release assembly is a relative sliding displacement with the same degree of freedom as the degree of freedom of said guiding contact.

Similarly, in some embodiments, in an advantageous manner, a guide bearing in accordance with the invention is also characterised in that said guiding contact is a translational guiding means in a sliding direction (axis), and in that said relative displacement of a guided piece with respect to the corresponding intermediate piece is a translation in said sliding direction. Thus, said relative displacement of the first guided piece with respect to the first intermediate piece is a translation in said sliding direction. As a variation or in combination, said relative displacement of said second guided piece with respect to the second intermediate piece is a translation in said sliding direction.

Furthermore, in some possible embodiments, an intermediate piece can form the corresponding bearing surface. Thus, in particular, preferably at least one bearing surface is formed by said corresponding intermediate piece. In particular, the first bearing surface is formed by the first intermediate piece. And, as the case may be, the second bearing surface is formed by the second intermediate piece. However, as a variation, there is nothing to prevent at least one other piece from being interposed between an intermediate piece and the corresponding bearing surface.

Each automatic release assembly can be used in all the possible embodiments for such an assembly so long as the technical function in accordance with the invention is carried out.

An automatic release assembly in accordance with the invention can be, in particular, an assembly comprising at least one deformable piece (collar, groove, shoulder, ring, protrusion, indentation, flutes, wedge . . . ) under the effect of a constraint between the intermediate piece and the guided piece—in particular between the first intermediate piece of the first guided piece—higher than a predetermined value corresponding to the triggering value. An automatic release assembly in accordance with the invention can also be a clamped assembly with a residual normal elastic constraint, e.g. a press fit ("bracing") under heat and/or pressure, fixedly attaching the pieces by static friction owing to the normal elastic constraint at the contact surfaces, up to a tangential constraint value above which relative sliding of the two pieces occurs. An automatic release assembly in accordance with the invention can also be an adhesive and/or welded assembly which is able to be broken, the adhesive and/or welded bond being weakened such that it breaks and releases the two pieces above a certain constraint value corresponding to said desired triggering value.

Therefore, in an advantageous manner and in accordance with the invention, at least one automatic release assembly—in particular each automatic release assembly—is selected from the group formed of deformable conjugated collar and groove assemblies, deformable conjugated shoulder assemblies, deformable conjugated ring and groove assemblies, deformable conjugated protrusion and indentation assemblies, deformable conjugated ball and indentation assemblies, deformable conjugated flute assemblies, deformable wedge assembles, breakable adhesive assemblies, breakable welded assemblies, clamped assemblies with residual normal elastic constraint (bracing) and combinations thereof. Other embodiments are possible.

In accordance with another aspect, in an advantageous manner, a guide bearing in accordance with the invention is also further characterised in that it comprises at least one triggering warning device adapted to be able to modify at least one guiding characteristic when at least one automatic release assembly passes from an assembly state in which it fixedly attaches a guided piece to the corresponding intermediate piece, to a release state in which it allows a relative displacement of the guided piece with respect to the corresponding intermediate piece, i.e. when the guidance forces exceed at least one of said triggering values.

Thus, in the case of a guide bearing comprising only the first automatic release assembly and at least one first intermediate piece, a triggering warning device is adapted to be able to modify at least one guiding characteristic when the first automatic release assembly allows a relative displacement of the first guided piece with respect to at least one first intermediate piece.

In the case of a guide bearing also comprising a second automatic release assembly and at least one second intermediate piece, a triggering warning device is adapted to be able to modify at least one guiding characteristic when at least one of the first and second automatic release assemblies allows a relative displacement of at least one of the first and second guided pieces with respect to at least one, the corresponding one, of the first and second intermediate pieces.

Such a warning device can be used in different embodiments so long as the corresponding technical function is carried out. In particular, a guiding characteristic modified by such a warning device can be used in numerous variations, in particular in accordance with the applications.

In some embodiments, in an advantageous manner and in accordance with the invention, such a warning device is adapted to modify at least said guidance forces—in particular to reduce the value thereof when the automatic release assembly passes into the release state. Thus, the guidance forces have a first value, corresponding e.g. to a nominal value, when each first intermediate piece and the first guided piece are fixedly attached under the effect of the first automatic release assembly; and the value of these guidance forces changes into a second value, in particular a substantially reduced value, when the first automatic release assembly passes into the release state in which it allows the relative displacement of the first guided piece with respect to at least one first intermediate piece. In this way, a user or automated machine manoeuvring a device incorporating a guide bearing in accordance with the invention can immediately detect that the triggering value of the first automatic release assembly has been exceeded, which requires maintenance to be carried out on this device.

In some applications, in an advantageous manner a guide bearing in accordance with the invention is also characterised in that it separates two chambers defined between the first and second guided pieces, in that said warning device comprises at least one communication passage between the two chambers, and in that an intermediate piece—in particular at least one of the first and second intermediate pieces—is adapted for:
  closing each communication passage when this intermediate piece and the corresponding guided piece are fixedly attached by said automatic release assembly,
  opening at least one communication passage by bringing the two chambers into communication when the intermediate piece and the guided piece are released with respect to each other by said automatic release assembly allowing relative displacement thereof.

For example, in the assembly state of the first automatic release assembly in which the first intermediate piece and the first guided piece are fixedly attached, each communication passage is closed by the first intermediate piece; and in the release state of the first automatic release assembly in which a relative displacement is permitted, by the first automatic release assembly, between the first intermediate piece and the first guided piece, this relative displacement has the effect of opening at least one communication passage and bringing the two chambers into communication with each other.

These embodiments are in particular possible and advantageous in the applications of a guide bearing in accordance with the invention in a shock absorber with fluid circulation (liquid and/or gas). In fact, when the two chambers are in fluid communication with each other, the shock absorber has a much weaker shock absorbing coefficient than it has when the two chambers are not in fluid communication with each other. For example, with such a shock absorber associated with an aircraft piloting device, in the event of seizing of a guide bearing in accordance with the invention in the shock absorber, the shock absorbing function will be lost but the pilot will be able to continue to pilot the aircraft. Owing to the warning device incorporated in the guide bearing, the loss of shock absorption will signal to the pilot and/or to a piloting system and/or automatic monitoring system of the aircraft that an untimely seizing incident has occurred.

A guide bearing in accordance with the invention can be used in many various applications.

The invention likewise extends in particular to a shock absorber
- in particular with fluid circulation (liquid and/or gas)—comprising at least one guide bearing in accordance with the invention.

A shock absorber in accordance with the invention advantageously comprises a rod which can move with respect to a shock absorber body, this movable rod forming at least one piston able to move in at least one shock absorbing chamber containing at least one fluid. The shock absorber in accordance with the invention also comprises at least one guide bearing in accordance with the invention for the rod which can move with respect to the shock absorber body.

The invention also extends in particular to a (hydraulic and/or pneumatic and/or electric and/or electromagnetic) cylinder (moving in translation and/or rotation) comprising at least one guide bearing in accordance with the invention.

A cylinder in accordance with the invention advantageously comprises at least one member which can move with respect to a cylinder body, and at least one drive device able to apply mechanical energy to each movable member in order to bring about its displacement with respect to the cylinder body. A cylinder in accordance with the invention also comprises at least one guide bearing in accordance with the invention for guiding each movable member with respect to the cylinder body.

In particular, a shock absorber or a cylinder in accordance with the invention can advantageously be incorporated on board a vehicle, in particular on board an aircraft, and most particularly in a piloting device.

The invention also relates to a guide bearing, a shock absorber and a cylinder which are characterised in combination by all or some of the features mentioned above or below.

BRIEF DESCRIPTION OF THE DRAWINGS

Other aims, features and advantages of the invention will become apparent upon reading the following description given by way of non-limiting example of some embodiments thereof, and which makes reference to the attached figures in which:

FIG. 8 is a diagram of a first embodiment of an automatic release assembly which can be used in a guide bearing in accordance with the invention, FIG. 9 is a diagram of a second embodiment of an automatic release assembly which can be used in a guide bearing in accordance with the invention,

DETAILED DESCRIPTION OF THE PREFERRED EMBODIMENTS

Figure 1:
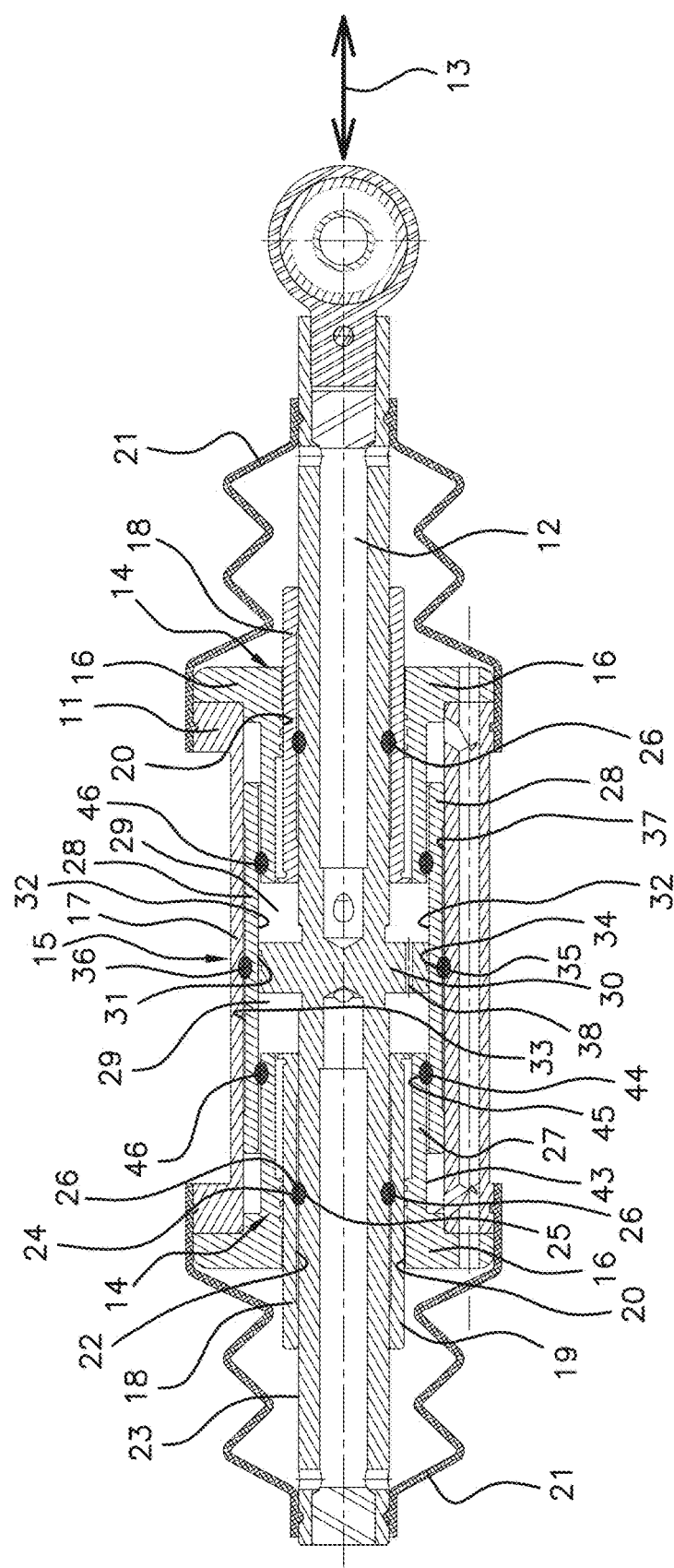
FIG. 1 is a schematic axial cross-sectional view of a shock absorber according to a first embodiment of the invention.
Figure 2:
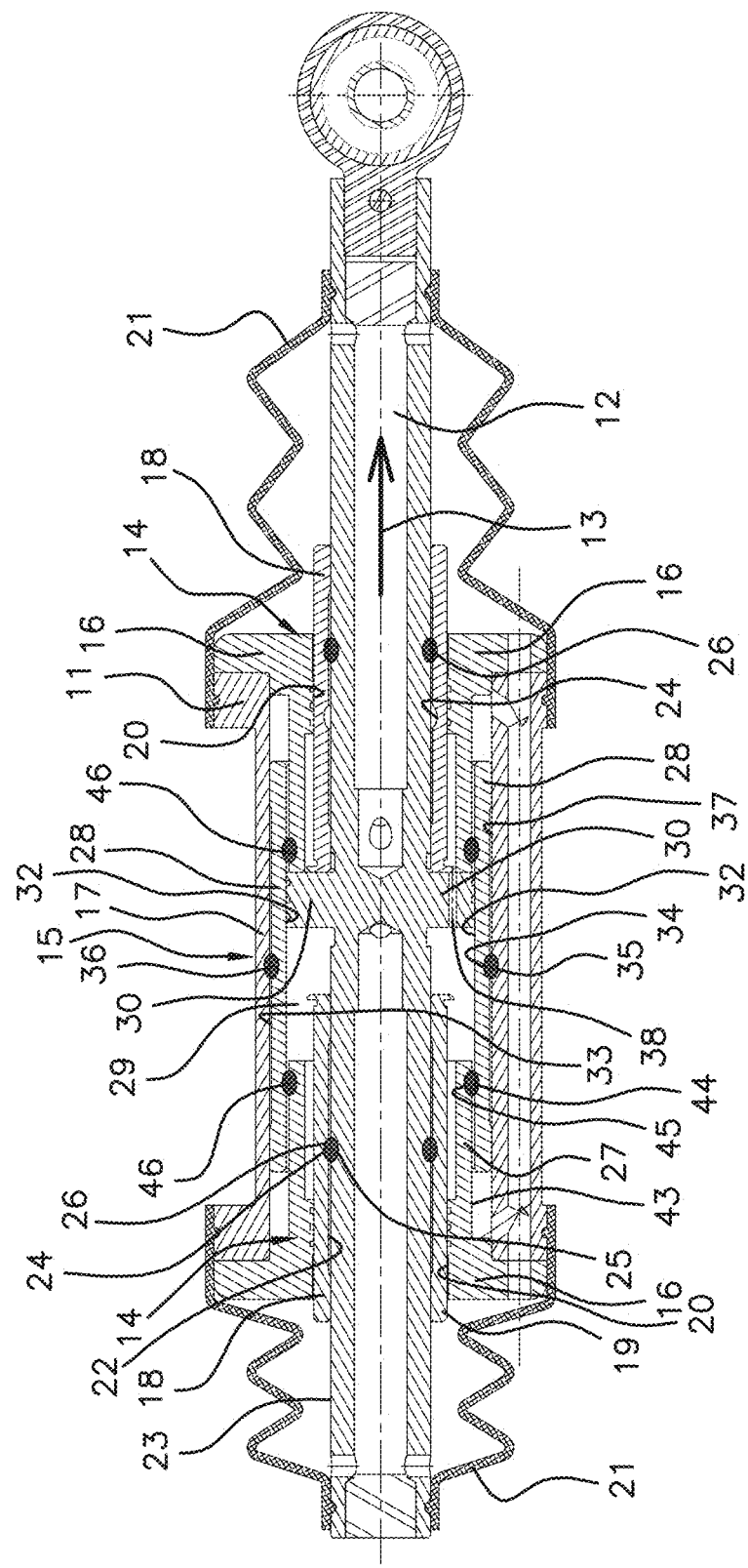
FIG. 2 is a schematic view of the shock absorber of FIG. 1 in the event of a first case of seizing of a guide bearing in accordance with the invention.
Figure 3:
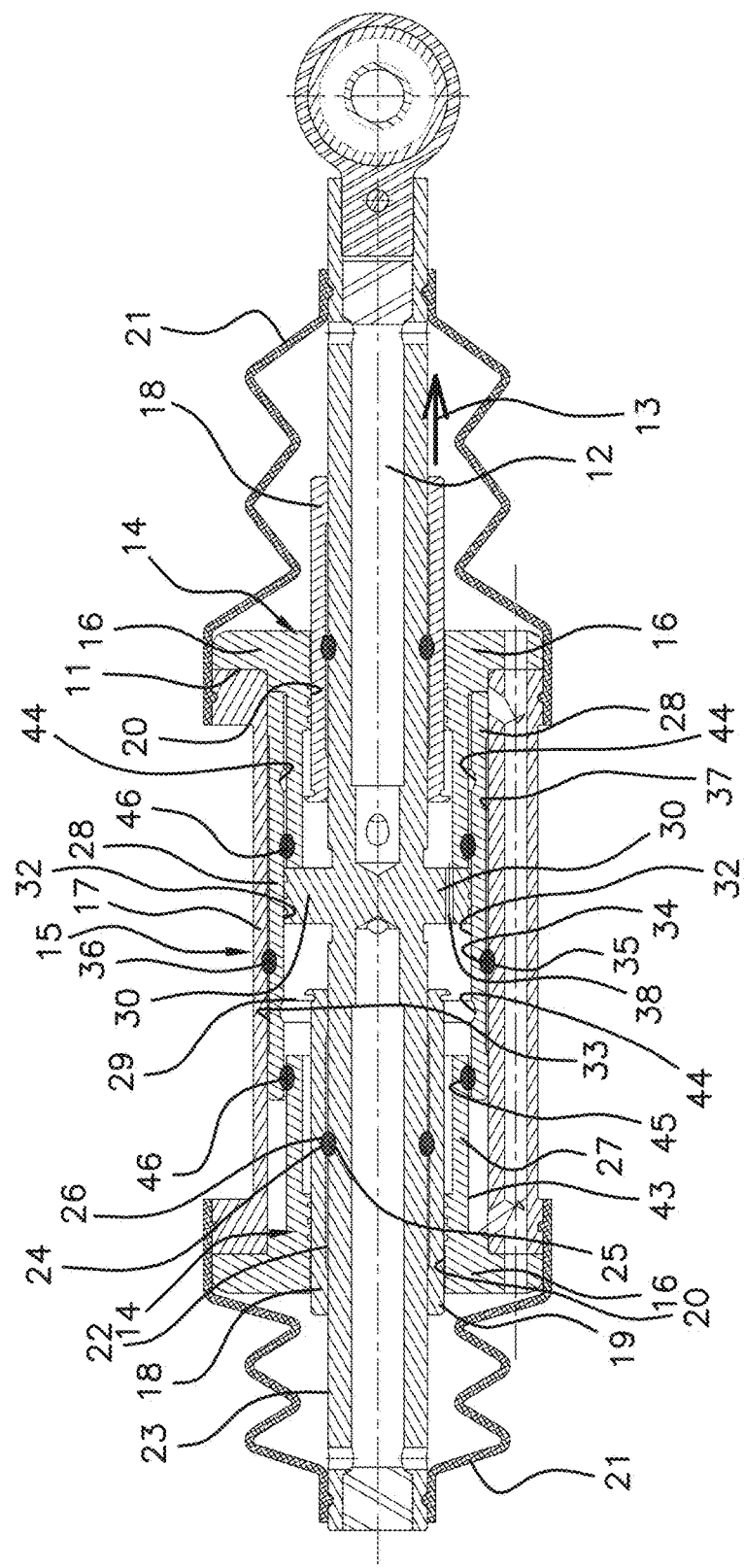
FIG. 3 is a schematic view of the shock absorber of FIG. 1 in the event of a second case of seizing of a guide bearing in accordance with the invention.
Figure 4:
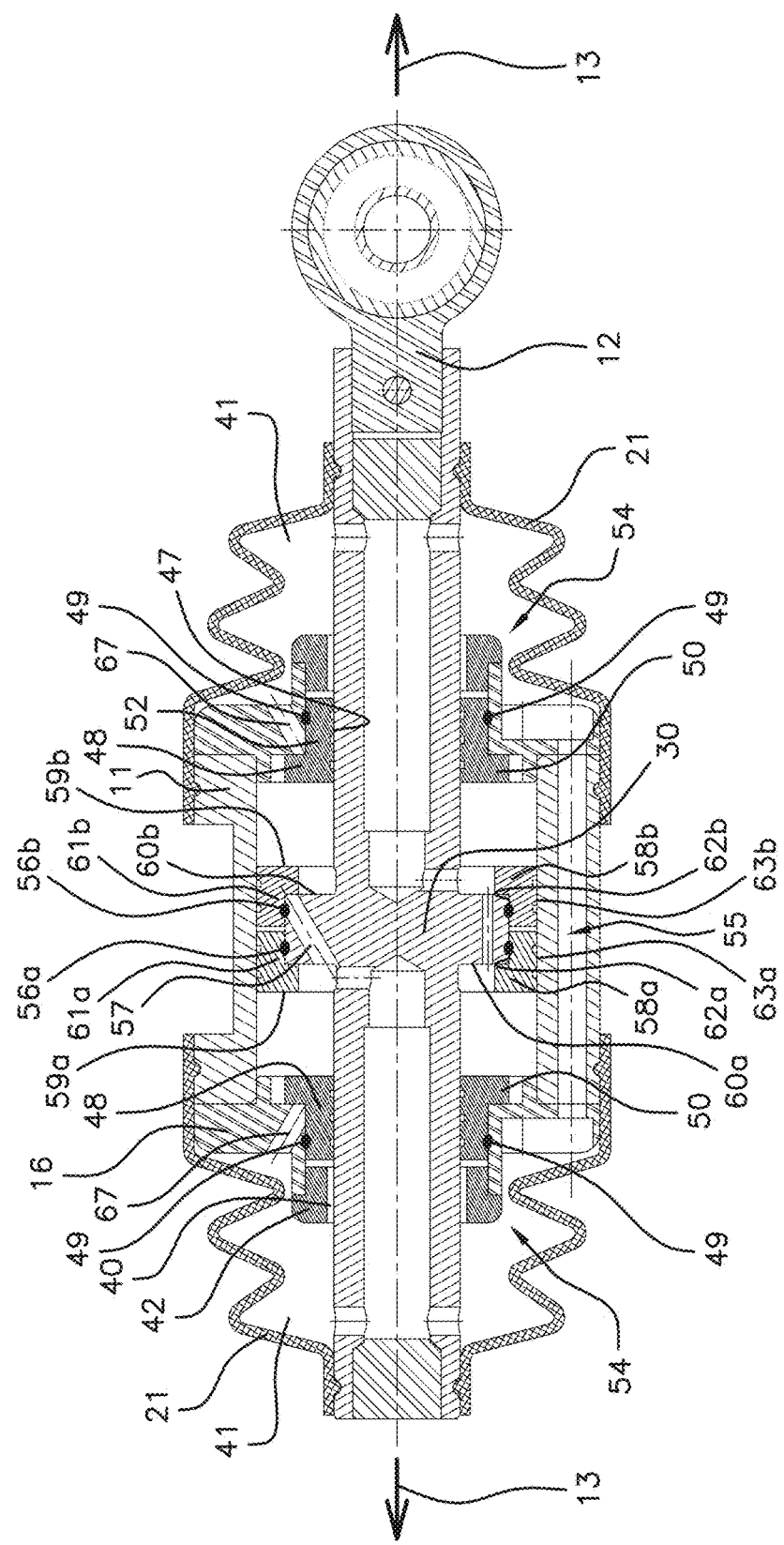
FIG. 4 is a schematic axial cross-sectional view of a shock absorber according to a second embodiment of the invention.
Figure 5:
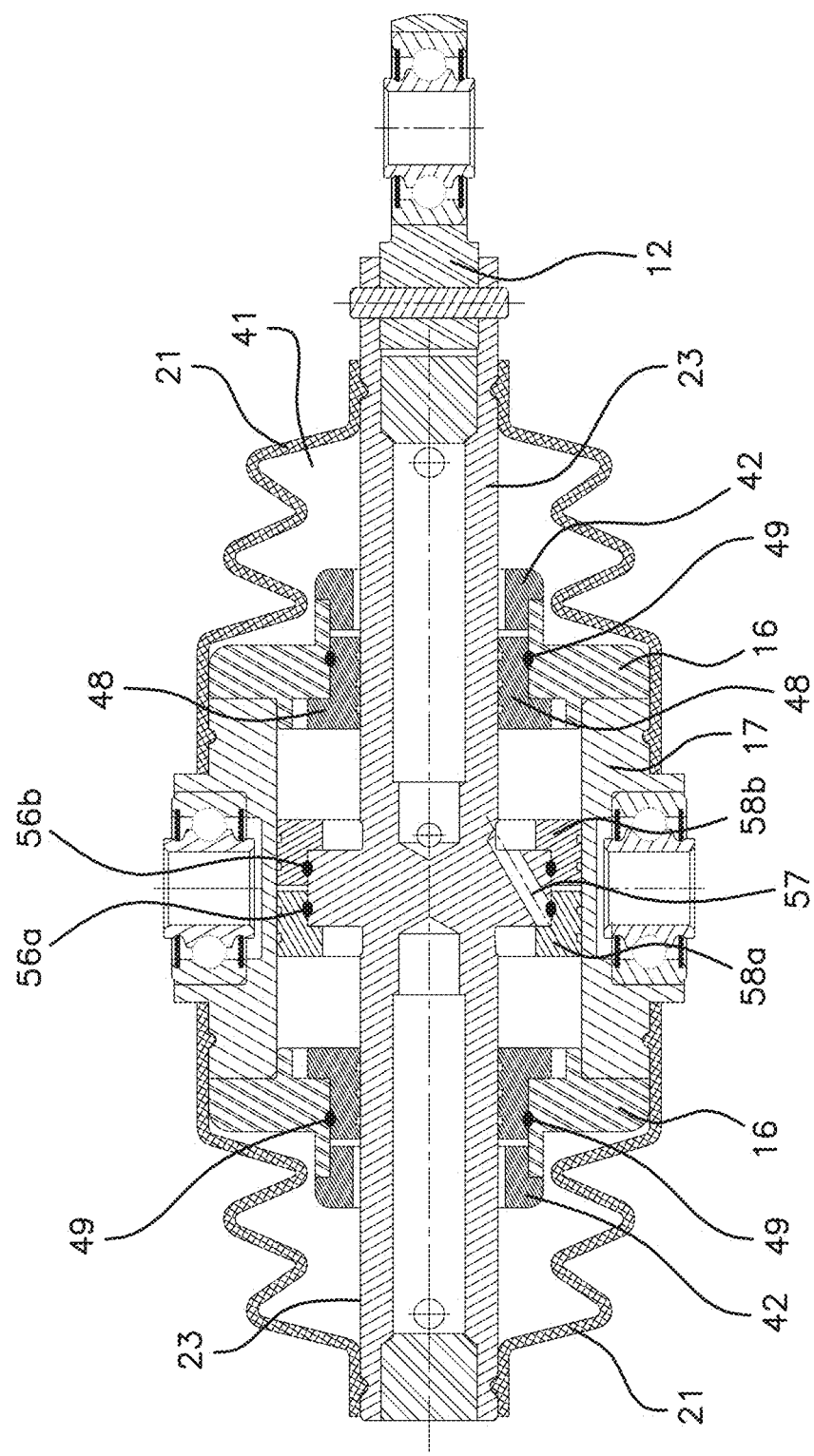
FIG. 5 is a schematic axial cross-sectional view at a line of cut orthogonal to that of FIG. 4.

A shock absorber in accordance with the invention according to a first embodiment shown in FIGS. 1 to 3 comprises a shock absorber body 11, with respect to which a shock absorber rod 12 is guided in translation in a guiding direction (axis) 13 by three guide bearings in accordance with the invention, i.e. two end guide bearings 14 at the two ends of the shock absorber body 11 and one central guide bearing 15. The shock absorber body 11 and shock absorber rod 12 are preferably but not necessarily rotationally symmetrical as a whole about the guiding direction 13.

The shock absorber body 11 comprises a main peripheral wall 17 and two end rings 16 rigidly fixed to this peripheral wall 17. Each end ring 16 has a bore axially passing through in the guiding direction, through which the shock absorber rod 12 extends. This bore has a cylindrical internal rotational surface 20. Bellows 21 connect the end rings 16 of the shock absorber body 11 to the longitudinal ends of the shock absorber rod 12 respectively.

Since the two end guide bearings 14 of this first embodiment are similar and are symmetrical with one another with respect to a middle transverse plane of the shock absorber body 11 only one of them will be described hereinunder.

For each end guide bearing 14 in accordance with the invention, the shock absorber rod 12 forms a first guided piece, the end ring 16 of the shock absorber body 11 forming a second guided piece. A cylindrical sleeve 18 extends about the shock absorber rod 12 in the portion thereof which passes through the end ring 16, preferably protruding axially towards the exterior of the end ring 16 over a certain length. The cylindrical sleeve 18 has an external peripheral surface 19 forming a first guiding bearing surface 19 coming into sliding contact with the internal surface 20 of the bore of the end ring 16 of the shock absorber body 11, this internal surface 20 thus forming a second guiding bearing surface 20. The cylindrical sleeve 18 also has an internal surface 22 extending about the external surface 23 of the shock absorber rod 12.

The cylindrical sleeve 18 constitutes a first intermediate piece mounted on the shock absorber rod 12 and about the latter by a first automatic release assembly 24, 25, 26. The cylindrical sleeve 18 is fitted around the shock absorber rod 12 so as to be able to slide in the guiding direction 13 with respect to the latter when this first assembly 24, 25, 26 permits a relative displacement of the cylindrical sleeve 18 with respect to the shock absorber rod 12. In order to do so, the internal diameter of the internal surface 22 of the cylindrical sleeve 18 is very slightly greater than the external diameter of the external surface 23 of the shock absorber rod 12.

In the illustrated example, this first automatic release assembly 24, 25, 26 is formed by a deformable ring 26 inserted in a groove 25 hollowed out radially towards the interior at the periphery of the external surface 23 of the shock absorber rod 12 and in a groove 24 hollowed out radially towards the exterior in the internal surface 22 of the cylindrical sleeve 18.

The deformable ring 26 is e.g. a ring of elastically compressible synthetic material or a metal alloy split ring. It has a cross-section conjugate to that of the grooves 24, 25 into which it is inserted, in particular of circular or elliptical form.

The assembly is arranged such that in the absence of seizing of the guiding contact between the cylindrical sleeve 18 and the end ring 16 of the shock absorber body 11, the cylindrical sleeve 18 is fixedly attached to the shock absorber rod 12 and is driven therewith in axial translation in the guiding direction 13, the external surface 19 of the cylindrical sleeve 18 being guided in the internal surface 20 of the end ring 16, a sliding guiding contact taking place between these two pieces. The deformable ring 26 is thus sufficiently rigid to be able to transmit the guidance forces between the shock absorber rod 12 and the cylindrical sleeve 18 thus permitting the relative displacements of the shock absorber rod 12 with respect to the shock absorber body 11 and the performance of the shock absorbing function of the shock absorber in accordance with the invention. In practice, the deformable ring 26 is sufficiently rigid to remain trapped by the two grooves 24, 25 when the guidance forces correspond to the shock absorbing forces of the shock absorber and do not exceed a triggering value above which the deformable ring 26 deforms under the effect of the shearing stresses it undergoes, possibly such that it exits at least one of the grooves 24, 25, thus permitting relative translational displacements in the guiding direction 13 of the shock absorber rod 12 with respect to the cylindrical sleeve 18.

Thus, when the guidance forces of the shock absorber rod 12 with respect to the end ring 16 of the shock absorber body 11 exceed a certain triggering value selected to correspond to an abnormal friction value occurring in guiding contact between the cylindrical sleeve 18 and the end ring 16 of the shock absorber body 11, in particular in the case of at least partial seizing of this guiding contact, the deformable ring 26 exits at least one of the grooves 24, 25, or even both grooves 24, 25, thus permitting the relative displacements of the shock absorber rod 12 with respect to the end ring 16 and thus with respect to the shock absorber body 11. The automatic release assembly 24, 25, 26 is thus automatically released, which makes it possible to maintain relative mobility of the shock absorber rod 12 with respect to the shock absorber body 11, including in the case of seizing of the guiding contact between the first bearing surface 19 and the second bearing surface 20.

If the cross-section of the ring 26 and that of the grooves 24, 25 are symmetrical with respect to a transverse plane orthogonal to the guiding direction 13 as in the illustrated example, the automatic release assembly 24, 25, 26 is bidirectional, i.e. fixedly attaches the shock absorber rod 12 to the cylindrical sleeve 18 in both displacement orientations, but allows their release, i.e. their relative displacement, above a certain triggering value of the guidance forces in one or the other displacement orientation of the shock absorber rod 12 with respect to the shock absorber body 11. Thus, the triggering value of the automatic release assembly 24, 25, 26 in a displacement orientation of the shock absorber rod 12 in the shock absorber body 11 and the triggering value of this same assembly in the other displacement orientation are the same.

However, there is nothing to prevent the provision of different triggering values in one and the other displacement orientation, e.g. by providing the ring 26 and/or at least one of the grooves 24, 25 with non-symmetrical cross-sectional shapes.

There is also nothing to prevent providing for the assembly to permit automatic release only in one displacement orientation of the shock absorber rod with respect to the shock absorber body, thus preventing any release in the other displacement orientation. In order to do this, the deformable ring 26 and the grooves 24, 25 can be selected so as to form transverse shoulders in contact in one displacement orientation no matter what the value of the guidance forces to prevent any release of the assembly in this displacement orientation.

The two end rings 16 at the two ends of the shock absorber body 11 each have a skirt 27 extending axially towards the interior, and the two skirts 27 of the two end rings 16 are mounted on a cylindrical jacket 28 defining, with the two end rings 16 and the shock absorber rod 12, a shock absorbing chamber 29 containing a fluid. The cylindrical jacket 28 has a cylindrical internal surface 32 with an axis parallel to the guiding direction 13.

The shock absorber rod 12 forms, in its central part, a piston 30 arranged to move in the shock absorbing chamber 29, the piston 30 having an external peripheral surface 31 coming into sliding contact against the internal surface 32 of the jacket 28, thus forming the central guide bearing 15. This piston 30 comprises at least one fluid shearing passage 38 bringing into fluid communication with a small effective cross-section the two parts of the shock absorbing chamber 29 which are separated by the piston 30, thus achieving fluid shock absorption during displacements of the piston 30 in the shock absorbing chamber 29. At least part of this fluid shock absorption can also be obtained by the fact that a certain circulation of fluid is permitted to the guiding contact between the piston 30 and the jacket 28.

The jacket 28 is mounted in the interior of the main peripheral wall 17 of the shock absorber body 11 by an automatic release assembly 34, 35, 36 comprising, in the illustrated example, a groove 34 hollowed out radially towards the interior of the external surface 33 of the jacket 28, a groove 35 hollowed out radially towards the exterior of the internal surface 37 of the peripheral wall 17 of the shock absorber body 11, and a deformable ring 36 engaged in the grooves 34, 35. The jacket 28 is fitted in the interior of the wall 17 of the shock absorber body 11 so as to be able to move in translation in the guiding direction 13 when the automatic release assembly 34, 35, 36 permits these displacements, i.e. when the guidance forces exceed a certain triggering value corresponding in particular to seizing of the piston 30 with respect to the jacket 28.

It should also be noted that the jacket 28 is also mounted on the skirts 27 of the end rings 16 of the shock absorber body 11 by automatic release assemblies each comprising, in the illustrated example, a groove 44 hollowed out radially towards the exterior of the internal surface 32 of the jacket 28, a groove 45 hollowed out radially towards the interior of the external surface 43 of the skirt 27 of the end ring 16, and a deformable ring 46 engaged in the grooves 44, 45. The jacket 28 is fitted around the skirts 27 of the end rings 16 so as to be able to move in translation in the guiding direction 13 when the corresponding automatic release assembly 44, 45, 46 permits these displacements.

When the guidance forces of the piston 30 with respect to the shock absorber body 11 exceed a triggering value above which the rings 36, 46 of these automatic release assemblies deform in order to be able to exit at least one of their corresponding grooves, the jacket 28 can move in translation in the interior of the main peripheral wall 17 of the shock absorber body and on the exterior of the skirts 27 of the end rings 16 in the guiding direction 13.

In this central guide bearing 15 of the first embodiment, the first guided piece is formed by the shock absorber body 11 (main peripheral wall 17 and end rings 16), the jacket 28 forms a first intermediate piece, and the piston 30 of the shock absorber rod 12 forms the second guided piece of the bearing. This central guide bearing 15 in accordance with the invention comprises three automatic release assemblies. Triggering values defined by the three automatic release assemblies are preferably the same, the shock absorber in accordance with the invention being a symmetrical bidirectional shock absorber. However, there is nothing to prevent the provision of different triggering values in one orientation and the other. For example, it will suffice to provide deformable rings 46 with different levels of rigidity.

In a shock absorber in accordance with the first embodiment of the invention illustrated in FIGS. 1 to 3, the central guide bearing 15 and the end guide bearings 14 are self-triggering bearings in accordance with the invention. The automatic release assemblies 24, 25, 26; 34, 35, 36; 44, 45, 46 are bidirectional automatic release assemblies. Furthermore, the transition from the release state of at least one of the automatic release assemblies causes a modification in the behaviour of the shock absorber, the friction forces of the corresponding guiding contact being substantially modified, the first intermediate piece being at least partially locked with respect to the second guided piece, the guiding taking place by sliding and translation of the first piece with respect to the first intermediate piece. This modification of at least one guiding characteristic between the shock absorber rod 12 and the shock absorber body 11 constitutes a warning device signalling that an at least partial locking has occurred in the guiding contact of a guide bearing. Nevertheless, in the first embodiment, this modification is insignificant and may not even exist in the actual embodiment of the shock absorber and of each automatic release assembly.

In the second embodiment illustrated in FIGS. 4 to 7, the shock absorber comprises a warning device more substantially modifying the guiding characteristic between the shock absorber rod 12 and the shock absorber body 11. In the following description of this second embodiment, the same numerical references are used to designate the same pieces as those of the first embodiment.

In this second embodiment, the central guide bearing 15 of the first embodiment is replaced by a central guide bearing 55 which is also self-triggering in accordance with the invention. In this central guide bearing 55, the first guided piece is formed by the piston 30 of the shock absorber rod 12, capped on each side by two half-rings 58a, 58b each respectively mounted on the piston 30 by an automatic release assembly 56a, 56b. Each half-ring 58a, 58b constitutes a first intermediate piece of the central guide bearing 55.

Each half-ring 58a, 58b has a transverse crown 59a, 59b (extending orthogonally to the guiding direction 13 and to the axis of the shock absorber rod 12) coming to bear against a transverse face 60a, 60b of the piston 30. In this way, in a translation orientation of the shock absorber rod 12 corresponding to the abutment of the transverse face 60a, 60b of the piston against the crown 59a, 59b of the half-ring 58a, 58b, the piston 30 can repel the half-ring 58a, 58b and drive it in translation.

Each half-ring 58a, 58b also has a skirt 61a, 61b extending radially to the exterior of the piston 30, interposed between the piston 30 and the main peripheral wall 17 of the shock absorber body 11.

The skirt 61a, 61b has a cylindrical internal surface 62a, 62b with an axis parallel to the guiding direction 13 which extends in a parallel manner and in contact with the cylindrical peripheral surface 31 of the piston 30 with which it is mounted by an automatic release assembly 56a, 56b which may be similar to those described with reference to the first embodiment.

In one variation, the automatic release assembly 56a, 56b can be formed by tightly fitting the skirt 61a, 61b onto the piston 30 with a residual elastic constraint for radial clamping (of the bracing type), this residual constraint determining the static friction value between the skirt 61a, 61b and the piston 30, and thus the triggering value above which the automatic release assembly thus formed passes into the release state in which it permits a relative displacement in translation of the piston 30 with respect to the skirt 61a, 61b of the half-ring 58a, 58b, in the displacement orientation in which the piston 30 moves away from the crown 59a, 59b.

The half-ring 58a, 58b also has a cylindrical external surface 63a, 63b with an axis parallel to the guiding direction 13, which also extends in a parallel manner and in contact with the cylindrical internal surface 37 of the main peripheral wall 17 of the shock absorber body 11 with which it is in guiding contact by sliding in translation. This external surface 63a, 63b of the half-ring 58a, 58b constitutes a first guiding contact bearing surface of the central guide bearing 55, while the internal surface 37 of the main peripheral wall 17 of the shock absorber body 11 constitutes a second bearing surface of the central guide bearing 55, this peripheral wall 17 of the shock absorber body 11 constituting the second guided piece of the central guide bearing 55.

It should be noted that in this second embodiment, each automatic release assembly 56a, 56b is a unidirectional automatic release assembly able to permit displacement of the half-ring 58a, 58b with respect to the piston 30 only in a single displacement orientation, the two automatic release assemblies 56a, 56b being in opposing orientations to permit the displacement of the piston 30 in both orientations in the case of locking of one and/or the other of the half-rings 58a, 58b with respect to the peripheral wall 17 of the shock absorber body 11.

The skirts 61a, 61b of the two half-rings 58a, 58b preferably extend over a length sufficient to be able to cover the major part, in particular all, of the peripheral surface 31 the piston 30, coming at least substantially into contact with one another, the two half-rings 58a, 58b forming a ring around the piston 30. Preferably, however, clearance is provided between the two skirts 61a, 61b so that contact between them does not interfere—taking account in particular of thermal dilations—with the operation of the automatic release assemblies 56a, 56b.

Moreover, the piston 30 is provided with passages, referred to as warning passages 57, able to bring into fluid communication the two parts of the shock absorbing chamber 29 separated by the piston 30. These warning passages 57 are arranged so that they are closed when the half-rings 58a, 58b are both mounted on the piston 30, the automatic release assemblies 56a, 56b being in the assembly state in which they fixedly attach the half-rings 58a, 58b to the piston 30. In this assembly state, the fluid cannot circulate in the warning passages 57 through the piston 30. In contrast, the warning passages 57 are arranged such that when at least one of the two half-rings 58a, 58b moves away from the piston 30, i.e. when at least one of the automatic release assemblies 56a, 56b passes into the release state, at least one of the warning passages 57 is open and permits circulation of the fluid between the two parts of the shock absorbing chamber 29 separated by the piston 30. In so doing, the shock absorbing characteristics of the shock absorber are substantially modified, the guidance forces of the shock absorber rod 12 with respect to the shock absorber body 11 being substantially reduced owing to the possibility of circulation of the fluid through the piston 30. Each warning passage 57 preferably has an effective cross-section greater than that of the fluid shearing passages 38 of the piston 30. This effective cross-section of each warning passage 57 can be selected to procure a much lower—virtually zero—level of shock absorption, permitting immediate detection of an at least partial seizing incident of one of the half-rings 58a, 58b on the main wall 17 of the shock absorber body 11.

The piston 30 comprises at least one first warning passage 57a which is open when the first automatic release assembly 56a is in the release state, and at least one second warning passage 57b which is open when the second automatic release assembly 56b is in the release state.

Figure 6:
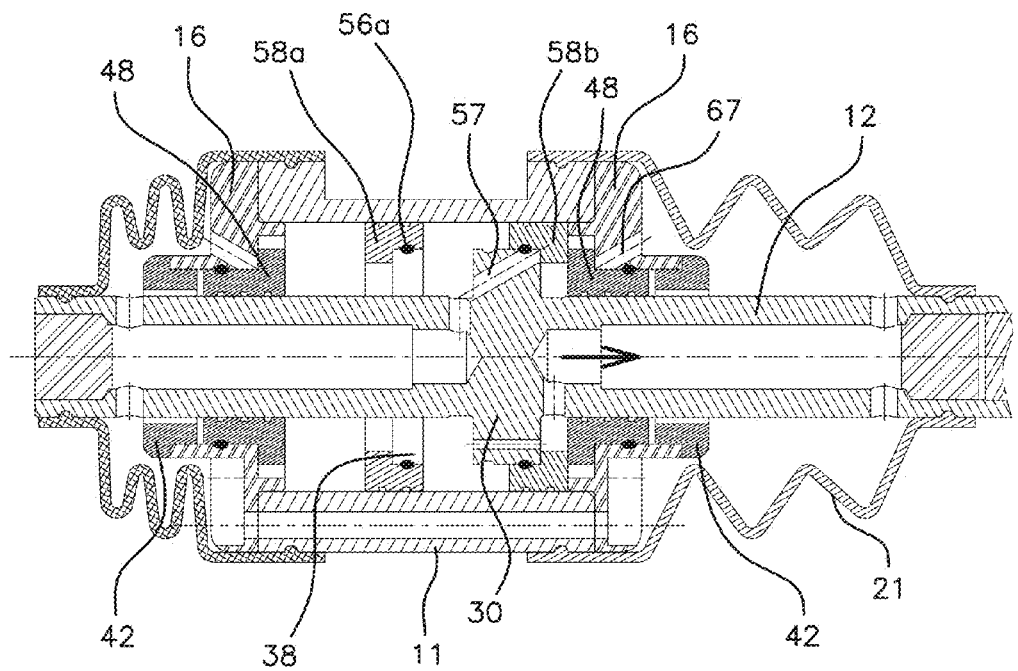
FIG. 6 is a schematic view of the shock absorber of FIG. 4 in the event of a first case of seizing of a guide bearing in accordance with the invention.

FIG. 6 illustrates the state of the shock absorber when one 58a (located on the right in FIG. 6) of the half-rings 58a, 58b is subject to a seizing incident with respect to the peripheral wall 17 of the shock absorber body 11 when the dynamic friction forces between this half-ring 58b and the internal surface 37 of the wall 17 exceed the triggering value of the automatic release assembly 56b, the half-ring 58b remaining in position with respect to the wall 17 of the shock absorber body 11 when the piston 30 is displaced in the orientation moving away from this half-ring 58b. As shown, a warning passage 57b is opened up and permits circulation of the fluid between the two parts of the shock absorbing chamber 29. In contrast, the automatic release assembly 56a of the other half-ring 58a located on the left in FIG. 6 is in the assembly state and the corresponding warning passage 57a is closed.

In the second embodiment, the end guide bearings 14 of the first embodiment are replaced by end guide bearings 54 which are also self-triggering in accordance with the invention. Since the two end guide bearings 54 are similar and are symmetrical with one another with respect to a middle transverse plane of the shock absorber body 11 only one of these guide bearings 54 is described hereinunder.

In each end guide bearing 54, the first guided piece is formed by the end ring 16 of the shock absorber body 11, and the second guided piece is the shock absorber rod 12. The cylindrical sleeve of the first embodiment is replaced by an internal half-ring 48 forming the first intermediate piece mounted on the end ring 16 of the shock absorber body 11 by an automatic release assembly 49.

The internal half-ring 48 has an internal transverse crown 50 (extending orthogonally to the guiding direction 13 and to the axis of the shock absorber rod 12) coming to bear against an internal transverse face 51 of the end ring 16 of the shock absorber body 11. In this way, in one translation orientation of the shock absorber rod 12 corresponding to the abutment of the transverse face 51 of the end ring 16 of the shock absorber body 11 against the crown 50 of the internal half-ring 48, the end ring 16 of the shock absorber body 11 prevents any translational displacement of the internal half-ring 48.

The internal half-ring 48 also has a skirt 52 extending radially in the interior of the end ring 16 of the shock absorber body 11, interposed between the end ring 16 of the shock absorber body 11 and the shock absorber rod 12.

The skirt 52 has a cylindrical external surface 53 with an axis parallel to the guiding direction 13 which extends in a parallel manner and in contact with the cylindrical internal surface 20 of the end ring 16 of the shock absorber body 11 with which it is mounted by an automatic release assembly 49 which may be similar to those described for the central guide bearing 55.

The skirt 52 also has a cylindrical internal surface 47 with an axis parallel to the guiding direction 13, which also extends in a parallel manner and in contact with the cylindrical peripheral surface 23 of the shock absorber rod 12 with which it is in guiding contact by sliding in translation. This internal surface 47 of the skirt 52 of the internal half-ring 48 constitutes a first contact bearing surface of the guiding contact of the end guide bearing 54, while the cylindrical peripheral surface 23 of the shock absorber rod 12 constitutes a second bearing surface of the end guide bearing 54.

It should be noted that in the end guide bearings 54 of this second embodiment, each automatic release assembly 49 is also a unidirectional automatic release assembly able to permit the displacement of the internal half-ring 48 with respect to the end ring 16 of the shock absorber body 11 uniquely in a single orientation of displacement, the two automatic release assemblies 49 of the two end guide bearings 54 being in opposite orientations.

Figure 7:
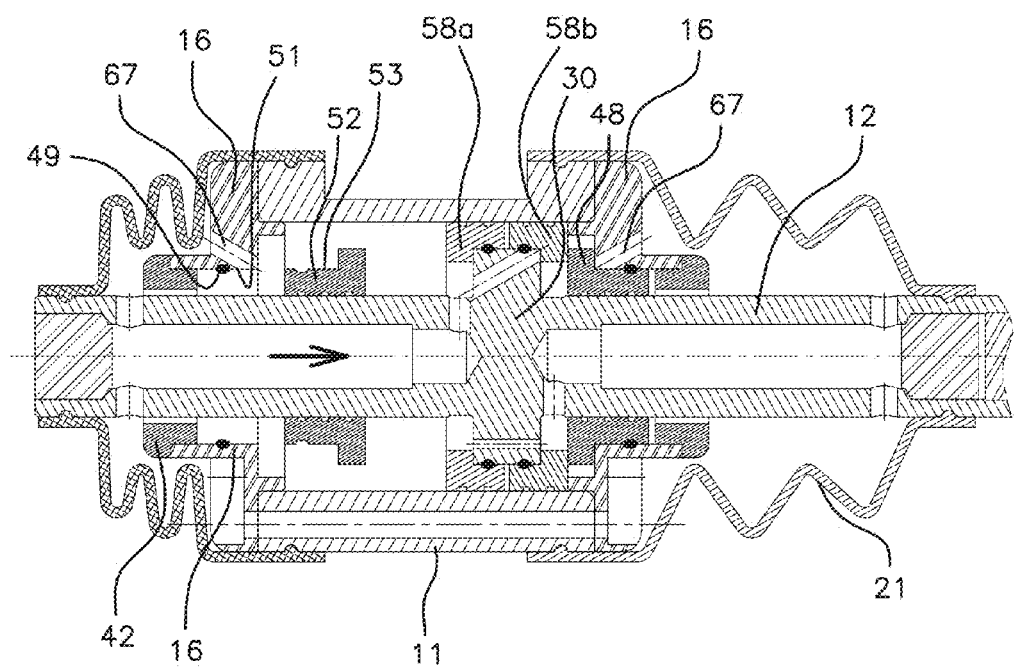
FIG. 7 is a schematic view of the shock absorber of FIG. 4 in the event of a second case of seizing of a guide bearing in accordance with the invention.

A safety ring 42 is screwed to the exterior of the end ring 16 of the shock absorber body 11 and has an internal through bore 40 with an internal diameter greater than the external diameter of the shock absorber rod 12 so that when the shock absorber rod 12 is normally guided by the internal half-ring 48, the automatic release assembly 49 being in the assembly state, the external peripheral surface 23 of the shock absorber rod 12 does not come into contact with the internal bore 40 of the safety ring 42. In contrast, when the automatic release assembly 49 is in the release state, the internal half-ring 48 being displaced in the interior of the shock absorbing chamber 29 beyond the end ring 16 of the shock absorber body 11, the shock absorber rod 12 is no longer guided by this internal half-ring 48 which is no longer fixedly attached to the shock absorber body 11 (FIG. 7). In this release state, the safety ring 42 ensures a certain partial guidance of the shock absorber rod 12 with respect to the shock absorber body 11.

In FIG. 7, the automatic release assembly 49 of the end guide bearing 54 located on the left is in the release state, the internal half-ring 48 having been repelled towards the interior of the shock absorbing chamber 29 by the shock absorber rod 12 which has been displaced to the right, at least partial seizing having taken place between this internal half-ring 48 and the shock absorber rod 12. In contrast, the automatic release assembly 49 of the end guide bearing 54 located on the right is in the assembly state. And the assemblies 56a, 56b of the central guide bearing 55 are also in the assembly state.

Furthermore, the end ring 16 of the shock absorber body 11 is provided with at least one passage, named warning passage 67, being able to bring into fluid communication, through this end ring 16 of the shock absorber body 11, the shock absorbing chamber 29 with an external chamber 41 of the shock absorber extending on the exterior of the shock absorber body 11 and of the end ring 16 of the shock absorber body 11 and in the interior of bellows 21. Each warning passage 67 is arranged so that it is closed when the internal half-ring 48 is mounted on the end ring 16 of the shock absorber body 11, the automatic release assembly 49 being in the assembly state in which it fixedly attaches the internal half-ring 48 to the end ring 16 of the shock absorber body 11. In this assembly state, the fluid cannot circulate in the warning passage(s) 57 through the end ring 16 of the shock absorber body 11. In contrast, each warning passage 67 is arranged such that when the internal half-ring 48 moves away from the end ring 16 of the shock absorber body 11, i.e. when the automatic release assembly 49 passes into the release state, each warning passage 67 of the end guide bearing 54 is open and permits circulation of the fluid between the external chamber and the shock absorbing chamber 29 which are separated by the end ring 16 of the shock absorber body 11. In so doing, the shock absorbing characteristics of the shock absorber are substantially modified, the guidance forces of the shock absorber rod 12 with respect to the shock absorber body 11 being substantially reduced owing to the possibility of circulation of the fluid through the end ring 16 of the shock absorber body 11. Each warning passage 67 preferably has an effective cross-section selected so as to procure a much lower—virtually zero—level of shock absorption, permitting immediate detection of an at least partial seizing incident of the shock absorber rod 12 on the internal half-ring 48.

In the embodiments illustrated in the figures and described above, each guide bearing is provided with a single intermediate piece interposed between one of the guided pieces and the corresponding guiding bearing surface. However, there is nothing to prevent the provision, as a variation for the same guide bearing, of two intermediate pieces, i.e. a first intermediate piece interposed between a first guided piece and the first bearing surface, and a second intermediate piece interposed between the second guided piece and the second bearing surface, with at least one first assembly for automatic release of the first intermediate piece with respect to the first guided piece and at least one second assembly for automatic release of the second intermediate piece with respect to the second guided piece.

For example, it is possible to combine the two embodiments illustrated in the figures for the central guide bearing and/or for each end guide bearing. Thus, the piston 30 would be provided with two half-rings 58a, 58b in accordance with the second embodiment, and these half-rings 58a, 58b would come into guiding contact against a jacket 28 mounted on the main peripheral wall 17 of the shock absorber body 11 in accordance with the first embodiment. In the same way, a cylindrical sleeve 18 would be mounted on the shock absorber rod 12 in accordance with the first embodiment and this cylindrical sleeve 18 would come into guiding contact against an internal half-ring 48 mounted on the end ring 16 of the shock absorber body 11 in accordance with the second embodiment.

FIG. 8 schematically illustrates an embodiment of an automatic release assembly of a guide bearing in accordance with the invention. In this example, an intermediate piece 70 is provided with a groove 71 hollowed out in a face of this intermediate piece 70 and of which the cross-section is in the form of an arc of a circle, preferably slightly smaller than a semi-circle, and the corresponding guided piece 72 has a peripheral annular rib 73 protruding from a face of the guided piece 72 and forming a ring of a shape and dimensions which are conjugated to those of said groove 71 of the intermediate piece 70. In the assembly state, the rib 73 extends in the interior of the groove 71. By reason thereof, the intermediate piece 70 and the guided piece 72 are fixedly attached in translation in the guiding direction 13.

When the guidance forces which produce shearing stresses in this assembly exceed a triggering value predetermined by the shape and elasticity characteristics of the groove 71 and/or rib 73, the rib 73 exits the groove 71 as shown in FIG. 8, the assembly being in the release state. The groove 71 and the rib 73 are e.g. peripheral to the rotation about the guiding direction 13 and are provided on the cylindrical rotational faces of the intermediate piece 70 and the guided piece 72.

In the variant embodiment of FIG. 9, the rib 73 is replaced by a groove 74 hollowed out in the face of the guided piece 72, and by a ring 75 of a shape and dimensions which are adapted to be able to be introduced, in the assembly state, into the groove 71 of the intermediate piece 70 and into the groove 74 of the guided piece 72. By reason thereof, the intermediate piece 70 and the guided piece 72 are fixedly attached in translation in the guiding direction 13.

When the guidance forces which produce shearing stresses in this assembly exceed a triggering value predetermined by the shape and elasticity characteristics of the groove 71 of the intermediate piece 70 and/or the groove 74 of the guided piece 72 and/or of the ring 75, the ring 75 exits at least one of the grooves 71, 74, in particular both grooves 71, 74, as illustrated by FIG. 9, the assembly being in the release state.

If the shape of one or the other of the grooves and/or that of the ring is not symmetrical with respect to a middle transverse plane, it is possible to obtain different triggering values in one orientation and in the other of the guidance forces according to the guiding direction 13.

It goes without saying that each automatic release assembly of a guide bearing in accordance with the invention can be used in numerous other embodiments provided that the technical function of this assembly is carried out. For example, such an automatic release assembly can be selected from the group formed of deformable conjugated collar and groove assemblies, deformable conjugated shoulder assemblies, deformable conjugated ring and groove assemblies, deformable conjugated protrusion and indentation assemblies, deformable conjugated ball and indentation assemblies, deformable conjugated flute assemblies, deformable wedge assembles, breakable adhesive assemblies, breakable welded assemblies, clamped assemblies with residual normal elastic constraint (bracing) and combinations thereof. Any other embodiments are possible.

The invention can also comprise numerous other variations of embodiment and application. In particular, it can also relate to a linear and/or rotational single-action or double-action hydraulic and/or pneumatic and/or electric and/or electromagnetic or other type of cylinder, i.e. an actuator. It applies equally well to a bearing comprising a contact for guiding by sliding without rolling as in the embodiments described and illustrated and to a bearing comprising a guiding contact of some other type, with partial rolling, or with rolling without sliding. It also applies to a rotary shock absorber and to guide bearings with rotary guiding contact.

The invention claimed is:

1. A bearing for guiding a first guided piece with respect to a second guided piece, comprising:
   a first bearing surface;
   a second bearing surface integral in displacement with said second guided piece, a translational sliding guiding contact being provided between said first bearing surface and said second bearing surface with the first guided piece and the second guided piece moving relative to each other along an axial direction;

at least one first intermediate piece interposed between said first bearing surface and said first guided piece; and at least one first automatic release assembly, wherein, i) in one state, named an assembly state, said at least one first automatic release assembly fixedly attaches said at least one first intermediate piece and said first guided piece, said at least one first automatic release assembly being in said assembly state when guidance forces, between said first guided piece and said second guided piece, are lower than a value, named triggering value of said first assembly, ii) in at least one state, named a release state, said at least one first automatic release assembly allows relative translation sliding displacement of said first guided piece with respect to said at least one first intermediate piece, with the first guided piece and said at least one first intermediate piece moving relative to each other along the axial direction, said at least one first automatic release assembly being in said release state when the guidance forces, between said first guided piece and said second guided piece, are greater than said triggering value of said first assembly, said at least one first automatic release assembly comprising at least one deformable piece deformable under an effect of a constraint, between said at least one first intermediate piece and said first guided piece, that is higher than a predetermined value corresponding to said triggering value of said first assembly, said at least one deformable piece forming part of a first deformable conjugated assembly.

2. The bearing as claimed in claim 1, wherein, said wherein said at least one first automatic release assembly is a bidirectional automatic release assembly, i) in a first release state, said at least one first automatic release assembly allows a relative translation sliding displacement of said first guided piece with respect to said at least one first intermediate piece, in a first translation sliding displacement direction, said at least one first automatic release assembly being in said first release state when the guidance forces, between said first guided piece and said second guided piece, are greater than a first corresponding triggering value, and ii) in a second release state, said at least one first automatic release assembly allows a relative translation sliding displacement of said first guided piece with respect to said at least one first intermediate piece, in a second translation sliding displacement direction opposite to said first translation sliding displacement direction, said at least one first automatic release assembly being in said second release state when the guidance forces, between said first guided piece and said second guided piece, are greater than a second corresponding triggering value.

3. The bearing as claimed in claim 1, wherein said first bearing surface is formed by said at least one first intermediate piece.

4. The bearing as claimed in claim 1, wherein, the bearing separates two chambers delimited between said first and second guided pieces, the bearing further comprises at least one communication passage between said two chambers, and said at least one first intermediate piece:

i) closes at least one communication passage when said at least one first automatic release assembly is in said assembly state, ii) opens at least one communication passage by bringing said two chambers into communication when said at least one first automatic release assembly is in said at least one release state, thus forming a triggering warning device modifying at least one guiding characteristic when said at least one first automatic release assembly passes from an assembly state to said at least one release state.

5. The bearing as claimed in claim 1, wherein said guidance forces between said first guided piece and said second guided piece:

i) have a first value in said assembly state of said at least one first automatic release assembly, and ii) have a second value in said release state of said at least one first automatic release assembly.

6. The bearing of claim 1, wherein said first deformable conjugated assembly is selected from a group formed of a deformable conjugated collar and groove assembly, a deformable conjugated ring and groove assembly, a deformable conjugated protrusion and indentation assembly, a deformable conjugated ball and indentation assembly, and combinations thereof.

7. The bearing as claimed in claim 1, further comprising at least one second intermediate piece interposed between said second bearing surface and said second guided piece and at least one second automatic release assembly, wherein, i) in one state, named an assembly state, said at least one second automatic release assembly fixedly attaches said at least one second intermediate piece and said second guided piece, said at least one second automatic release assembly being in said assembly state when the guidance forces, between said first guided piece and said second guided piece, are lower than a value, named a triggering value of said second assembly, and ii) in at least one state, named a release state, said at least one second automatic release assembly allows relative translation sliding displacement of said second guided piece with respect to said at least one second intermediate piece, at least in one translation sliding displacement direction, and said at least one second automatic release assembly being in said release state when the guidance forces, between said first guided piece and said second guided piece, are greater than said triggering value of said second assembly.

8. The bearing as claimed in claim 7, wherein said triggering value of said at least one first assembly and said triggering value of said at least one second assembly, are the same for a same orientation of said guidance forces between said first guided piece and said second guided piece.

9. The bearing as claimed in claim 7, wherein, said at least one second automatic release assembly is a bidirectional automatic release assembly, i) in a first release state, said at least one second automatic release assembly allows a relative translation sliding displacement of said second guided piece with respect to said second intermediate piece, in a first translation sliding displacement direction, said at least one second automatic release assembly being in said first release state when the guidance forces, between said first guided piece and said second guided piece, are greater than a first corresponding triggering value, and ii) in a second release state, said at least one second automatic release assembly allows a relative translation sliding displacement of said second guided piece with respect to said second intermediate piece, in a second translation sliding displacement direction opposite to said first translation sliding displacement direction, said at least one second automatic release assembly being in said second release state when the guidance forces, between said first guided piece and said second guided piece, are greater than a second corresponding triggering value.

10. The bearing as claimed in claim 7, wherein said relative translation sliding displacement of said second guided piece with respect to said second intermediate piece is a relative translation sliding displacement along said axial direction.

11. The bearing as claimed in claim 7, wherein said second bearing surface is formed by said at least one second intermediate piece.

12. The bearing as claimed in claim 7, wherein said at least one second automatic release assembly is selected from the group formed of assemblies comprising at least one deformable piece deformable under the effect of a constraint, between said second intermediate piece and said second guided piece, that is higher than a predetermined value corresponding to said triggering value of said second assembly.

13. The bearing as claimed in claim 7, wherein said at least one second automatic release assembly is a second deformable conjugated assembly.

14. The bearing as claimed in claim 7, wherein said guidance forces between said first guided piece and said second guided piece:
   i) have a first value in said assembly state of said at least one second automatic release assembly, and
   ii) have a second value in said release state of said at least one second automatic release assembly.

15. The bearing as claimed in claim 7, wherein,
the bearing separates two chambers delimited between said first and second guided pieces,
the bearing further comprises at least one communication passage between said two chambers, and
said at least one second intermediate piece:
   i) closes at least one communication passage when said at least one second automatic release assembly is in said assembly state, and
   ii) opens at least one communication passage by bringing said two chambers into communication when said at least one second automatic release assembly is in said at least one release state,
thus forming a triggering warning device modifying at least one guiding characteristic when said at least one second automatic release assembly passes from an assembly state to a release state.

16. A shock absorber comprising at least one bearing as claimed in claim 7.

17. A shock absorber comprising at least one bearing as claimed in claim 1.

18. A cylinder comprising at least one bearing as claimed in claim 1.

* * * * *